No. 820,738. PATENTED MAY 15, 1906.
T. C. SANDERSON.
TIRE FOR VEHICLES.
APPLICATION FILED JULY 14, 1905.
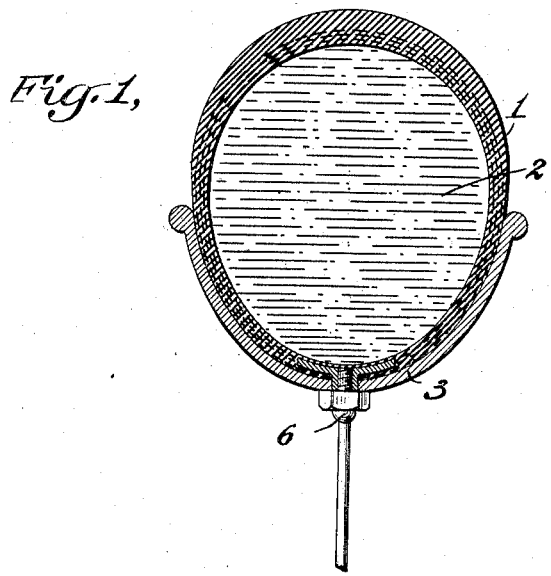
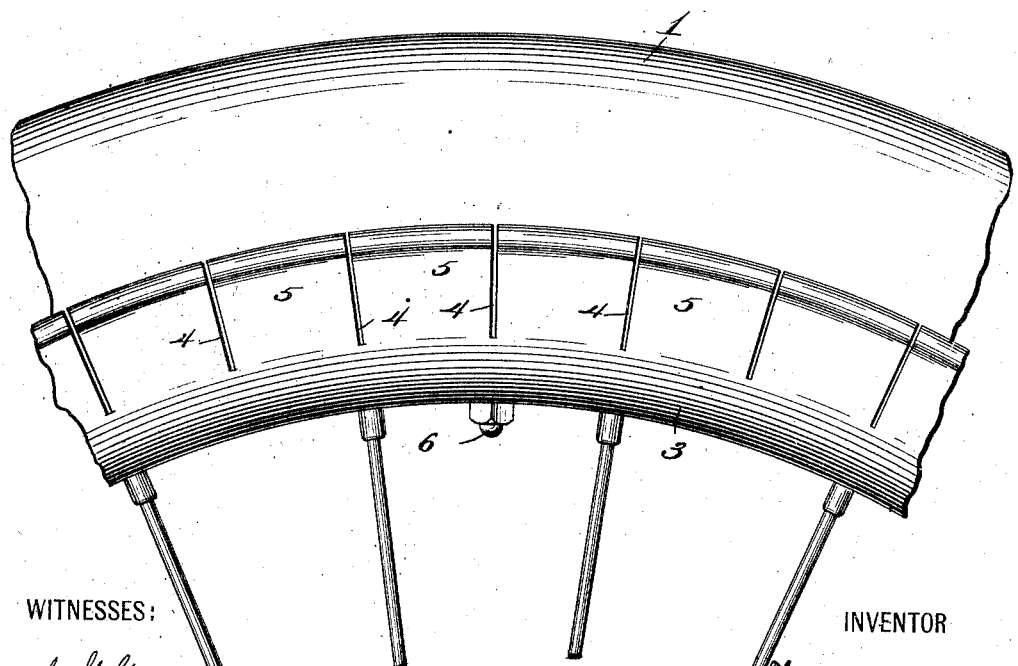
WITNESSES: INVENTOR
Thomas C. Sanderson
BY
Nicholas M. Goodlett
his ATTORNEY

UNITED STATES PATENT OFFICE.

THOMAS C. SANDERSON, OF WEST NEW BRIGHTON, NEW YORK.

TIRE FOR VEHICLES.

No. 820,738.　　　　Specification of Letters Patent.　　　Patented May 15, 1906.

Application filed July 14, 1905. Serial No. 269,573.

*To all whom it may concern:*

Be it known that I, THOMAS C. SANDERSON, a subject of the King of England, and a resident of West New Brighton, in the county of Richmond, Staten Island, and State of New York, have invented certain new and useful Improvements in Tires for Vehicles, of which the following is a specification.

This invention relates to new and useful improvements in vehicle-tires.

The invention seeks to provide a reliable, efficient, and economical tire and one that does not require the use of compressed air to maintain the tire in an inflated condition.

In the accompanying drawings, forming part of this specification, I have shown one embodiment of my invention.

Figure 1 is a transverse sectional elevation of the tire and rim. Fig. 2 is a side elevation of a portion of the tire and rim.

1 is the tire in the form of an annular tube. The tire may be made of rubber, canvas, or any other suitable materials. It preferably consists, and as shown, of a single tube. The tire is filled with a suitable semifluid or viscous substance 2, which is incapable of passing through small punctures in the tube. A sufficient quantity of this substance is forced into the tube to almost fill it.

3 is the rim of the wheel. It is preferably made of metal. It has a series of springs which bear against the walls of the tube at the sides to receive the outward pressure of the tube when in actual use. These springs are so arranged as to bear against the walls of the tube with sufficient pressure to distort the shape of the tube more or less from what it would be before being attached to the rim. When the tire is in use, the pressure of the road-surface or any inequality of the road is communicated by the viscous substance to all parts of the tube. The springs of course at this time act to put the tube under an increased pressure. As the wheel rolls forward the part released from the road contact immediately regains its former shape, owing to the road pressure on that part of the tire in contact with the road, and thus acts similarly to an ordinary pneumatic tire. The springs are of such strength as to enable a pressure to be carried within the tube sufficient to properly sustain the weight of the vehicle and load.

In the preferred arrangement the springs are formed by cutting slits 4 in the margins of the rim, so that the rim itself is formed into a series of spring-tongues 5. The tube may be detachably secured to the rim by any suitable means, such as bolts 6.

It will be seen that this invention avoids the use of compressed air, which, as is well known, so readily escapes from the tube through the slightest puncture. The viscous character of the substance which my invention employs within the tube prevents it from escaping through ordinary punctures, and thus overcomes one of the great difficulties which characterize tires now in common use.

What I claim, and desire to secure by Letters Patent, is—

1. The combination of a vehicle-tire comprising an annular tube containing a semifluid or viscous substance, with a rim having a series of springs bearing against the walls of the tube so as to deform the same, substantially as set forth.

2. The combination of a vehicle-tire comprising a single annular tube containing a semifluid or viscous substance, with a rim having a series of springs bearing against the walls of the tube so as to deform the same, substantially as set forth.

3. The combination of a vehicle-tire comprising an annular tube containing a semifluid or viscous substance, with a rim, having a series of springs bearing against the walls of the tube so as to deform the same, and means for detachably securing the tube to said rim, substantially as set forth.

4. The combination of a vehicle-tire comprising an annular tube containing a semifluid or viscous substance, with a rim having a series of springs bearing against the walls of the tube so as to deform the same, said springs being formed by slits cut in the margins of the rim, substantially as set forth.

5. The combination of a vehicle-tire comprising a single annular tube containing a semifluid or viscous substance, with a rim having a series of springs bearing against the walls of the tube so as to deform the same, said springs being formed by slits cut in the margins of the rim, substantially as set forth.

6. The combination of a vehicle-tire comprising an annular tube containing a semifluid or viscous substance, with a rim having a series of springs bearing against the walls of the tube so as to deform the same, said springs being formed by slits cut in the margins of the rim, and means for detachably securing the tube to said rim, substantially as set forth.

7. The combination of a vehicle-tire comprising a single annular tube containing a semifluid or viscous substance, with a rim having a series of springs bearing against the walls of the tube so as to deform the same, said springs being formed by slits cut in the margins of the rim, and means for detachably securing the tube to said rim, substantially as set forth.

In testimony whereof I have signed my name to this specification in the presence of two subscribing witnesses.

THOMAS C. SANDERSON.

Witnesses:
KATHARINE MACMAHON,
NICHOLAS M. GOODLETT, Jr.